(12) United States Patent
Awano et al.

(10) Patent No.: US 9,390,349 B2
(45) Date of Patent: Jul. 12, 2016

(54) DISPLAY CONTROL OF OBJECTS ON A DISPLAY

(71) Applicant: FUJI XEROX CO., LTD., Tokyo (JP)

(72) Inventors: Shigeru Awano, Kanagawa (JP); Tetsuya Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/618,177

(22) Filed: Feb. 10, 2015

(65) Prior Publication Data

US 2015/0242712 A1 Aug. 27, 2015

(30) Foreign Application Priority Data

Feb. 21, 2014 (JP) .................................. 2014-031858

(51) Int. Cl.
*G06K 15/00* (2006.01)
*H04N 1/00* (2006.01)
*G03G 15/00* (2006.01)

(52) U.S. Cl.
CPC ............ *G06K 15/002* (2013.01); *G03G 15/502* (2013.01); *H04N 1/00381* (2013.01); *H04N 1/00392* (2013.01); *H04N 1/00411* (2013.01); *H04N 1/00453* (2013.01); *H04N 1/00456* (2013.01); *H04N 1/00461* (2013.01); *H04N 1/00482* (2013.01)

(58) Field of Classification Search
None
See application file for complete search history.

(56) References Cited

U.S. PATENT DOCUMENTS

| | | | |
|---|---|---|---|
| 7,302,649 B2 | 11/2007 | Ohnishi | |
| 9,232,094 B2 * | 1/2016 | Kobayashi | ............... G06F 3/048 |
| 2005/0190147 A1 * | 9/2005 | Kim | .................... G06F 3/04886 345/156 |
| 2006/0221358 A1 * | 10/2006 | Takahashi | .......... H04N 1/00432 358/1.1 |
| 2009/0091770 A1 * | 4/2009 | Kano | ................. H04N 1/00132 358/1.1 |
| 2009/0164894 A1 * | 6/2009 | Takekawa | ........... G06F 3/04845 715/274 |
| 2010/0299638 A1 * | 11/2010 | Choi | ................... G06F 3/04886 715/835 |
| 2011/0025632 A1 * | 2/2011 | Lee | ....................... G06F 3/0482 345/173 |
| 2012/0212763 A1 * | 8/2012 | Honma | ................ G06F 3/1204 358/1.13 |
| 2012/0242629 A1 * | 9/2012 | Iriguchi | ............... G05B 19/409 345/204 |

FOREIGN PATENT DOCUMENTS

JP  2001-273066 A  10/2001

\* cited by examiner

*Primary Examiner* — Ming Hon
(74) *Attorney, Agent, or Firm* — Oliff PLC

(57) ABSTRACT

A display control apparatus includes a display and a controller. The display displays a screen on which a target image and a processing image are arranged, the target image representing processing-target data, the processing image being an image for which a process to be performed on the processing-target data has been determined. The controller performs, in a case where an operation for moving the target image toward a position where the processing image is displayed has been received as a touch operation through the screen, control such that the processing image is moved toward a position where the target image is displayed.

18 Claims, 10 Drawing Sheets

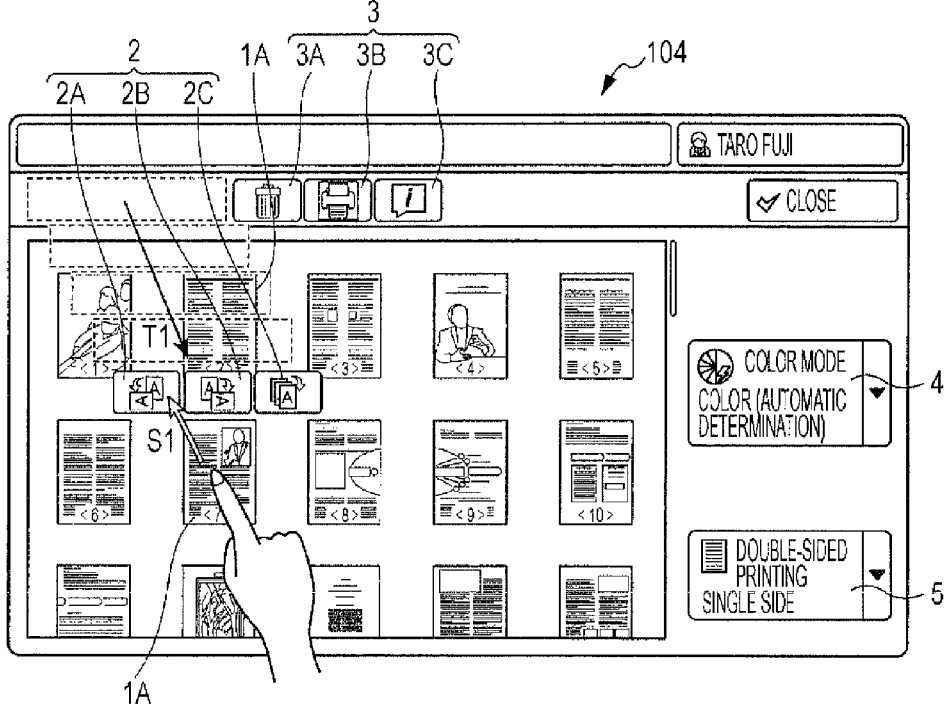
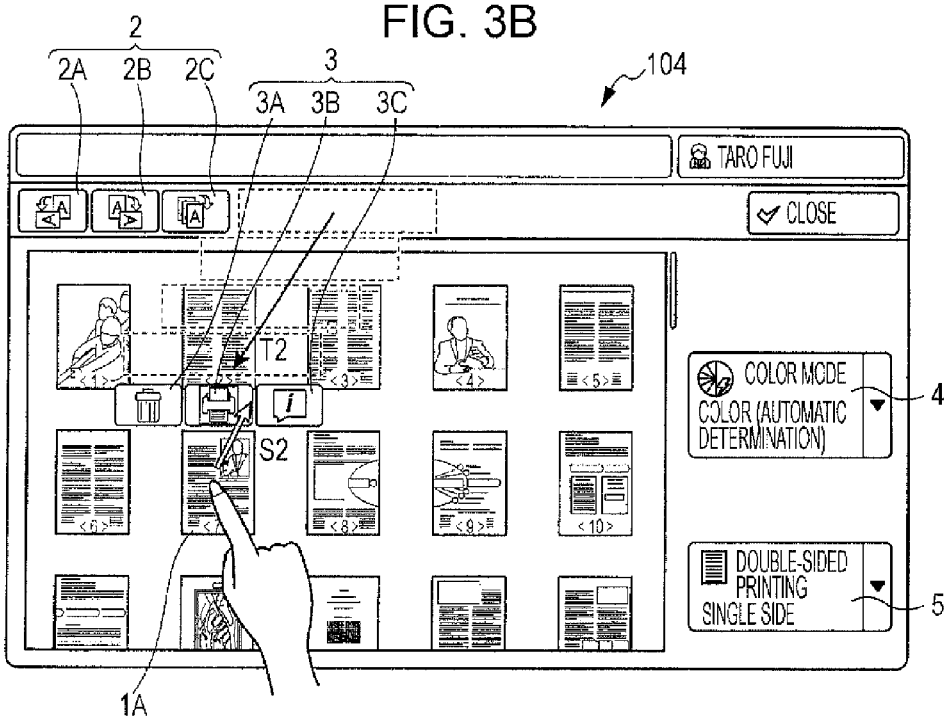

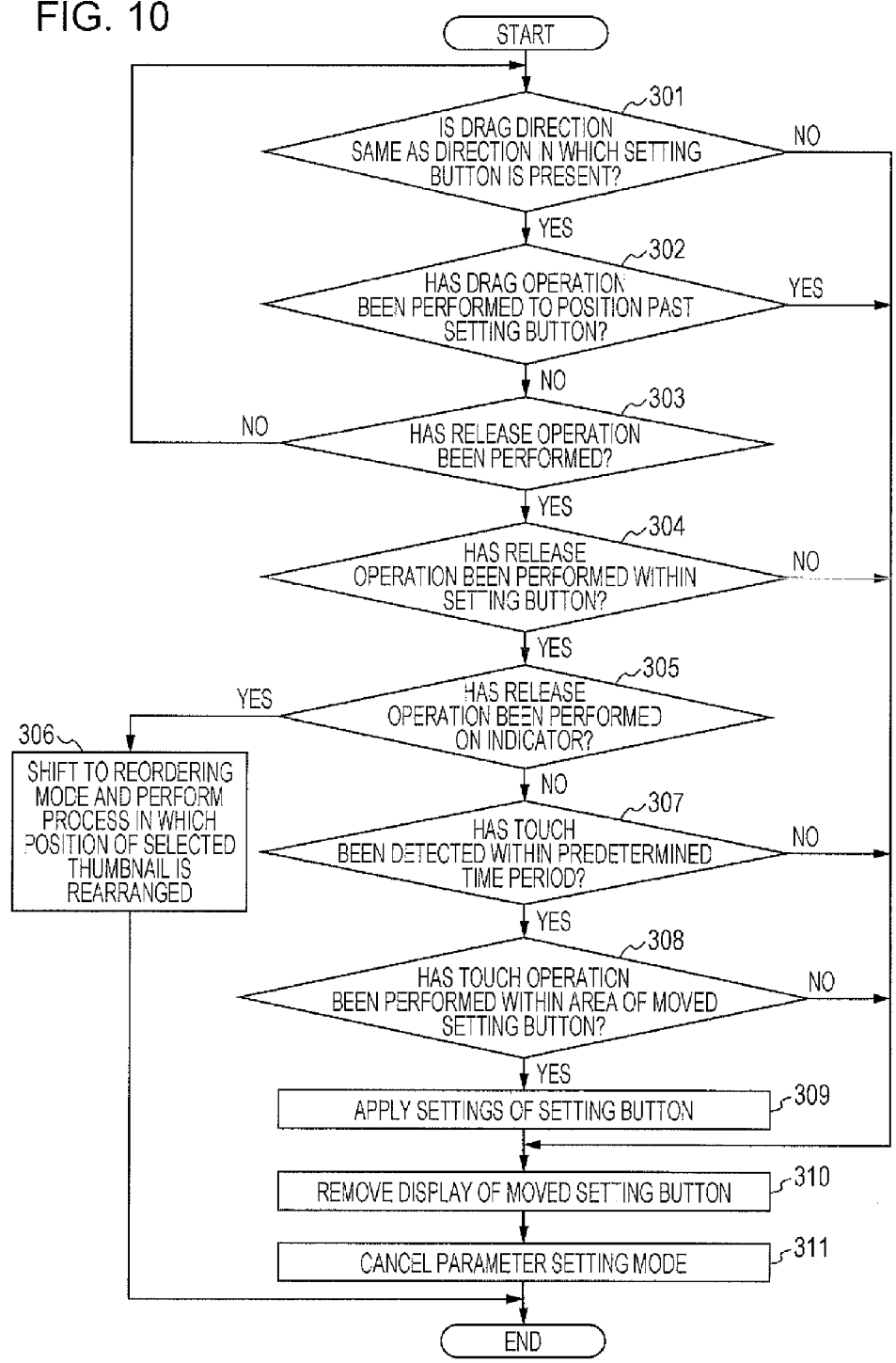

US 9,390,349 B2

DISPLAY CONTROL OF OBJECTS ON A DISPLAY

CROSS-REFERENCE TO RELATED APPLICATIONS

This application is based on and claims priority under 35 USC 119 from Japanese Patent Application No. 2014-031858 filed Feb. 21, 2014.

BACKGROUND

Technical Field

The present invention relates to a display control apparatus, an image forming apparatus, and a non-transitory computer readable medium.

SUMMARY

According to an aspect of the invention, there is provided a display control apparatus including a display and a controller. The display displays a screen on which a target image and a processing image are arranged, the target image representing processing-target data, the processing image being an image for which a process to be performed on the processing-target data has been determined. The controller performs, in a case where an operation for moving the target image toward a position where the processing image is displayed has been received as a touch operation through the screen, control such that the processing image is moved toward a position where the target image is displayed.

BRIEF DESCRIPTION OF THE DRAWINGS

An exemplary embodiment of the present invention will be described in detail based on the following figures, wherein:

FIGS. 3A and 3B are diagrams illustrating an example of a screen obtained when a drag operation is performed for a thumbnail image;

FIG. 10 is a flowchart illustrating another example of a processing procedure in which the controller applies settings of a certain setting button to a certain thumbnail image.

DETAILED DESCRIPTION

In the following, an exemplary embodiment of the present invention will be explained in detail with reference to the attached drawings.

<Configuration of Image Processing Apparatus>

Figure 1:
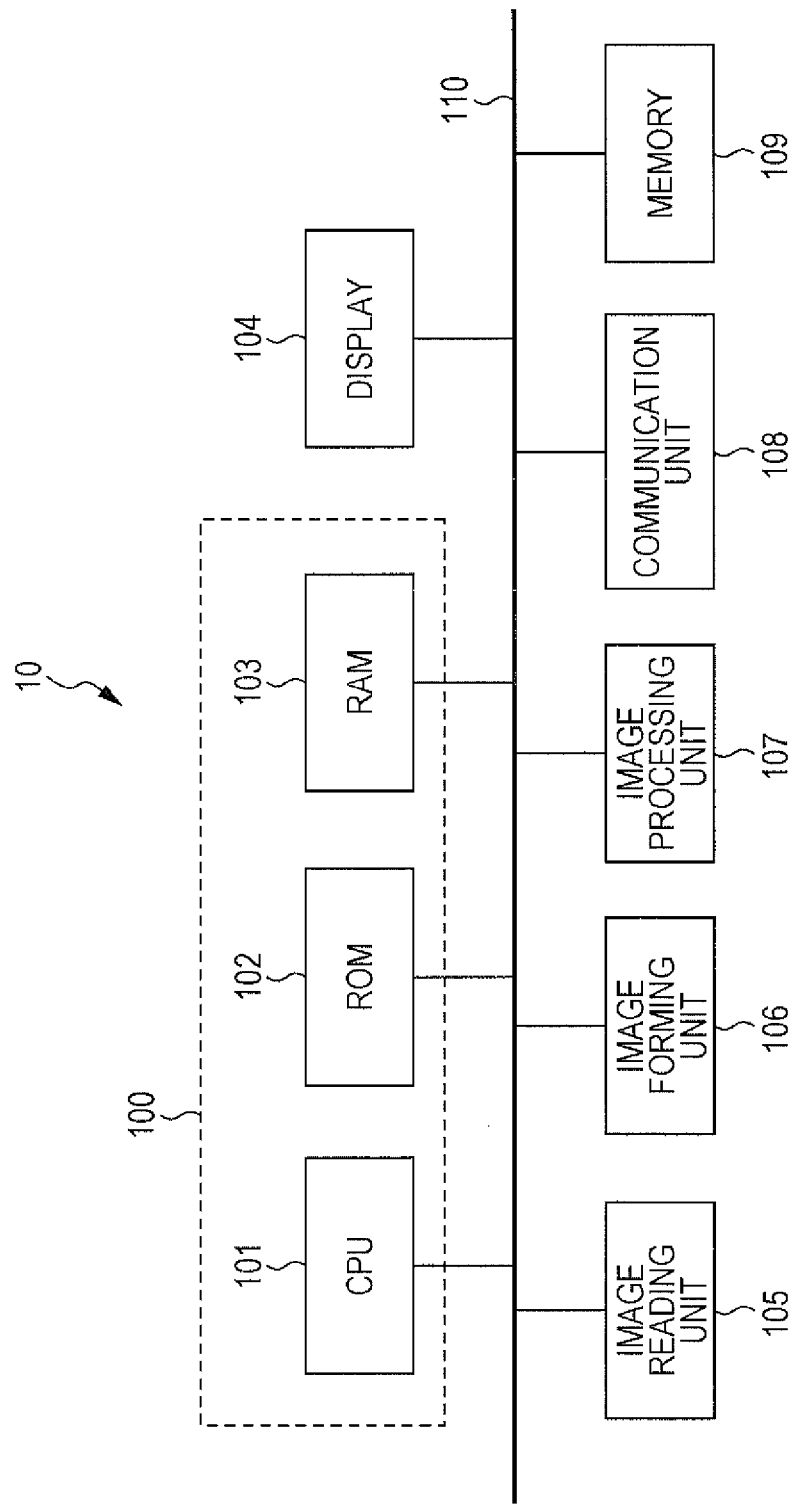
FIG. 1 is a block diagram illustrating an example of a configuration of an image processing apparatus according to an exemplary embodiment of the present invention.

FIG. 1 is a block diagram illustrating an example of a configuration of an image processing apparatus 10 according to the exemplary embodiment of the present invention. The image processing apparatus 10 according to the exemplary embodiment is, for example, an apparatus equipped with a scan function, a print function, a copy function, and the like. The image processing apparatus 10 includes a controller 100, a display 104, an image reading unit 105, an image forming unit 106, an image processing unit 107, a communication unit 108, and a memory 109. Note that these functional units are connected to a bus 110, and data transmission and data reception are performed via the bus 110. In addition, in the exemplary embodiment, the image processing apparatus 10 is used as an example of a display control apparatus and an image forming apparatus.

The display 104 serving as an example of a display includes, for example, a liquid crystal touch panel display (hereinafter referred to as a touch panel) and displays, for example, data regarding the image processing apparatus 10 under control of the controller 100. In addition, the display 104 detects a touch performed by a user on a displayed screen and receives an operation from the user. As a unit that detects a touch, any unit may be used such as a unit that detects a touch on the basis of pressure, a unit that detects a touch performed by an object on the basis of static electricity of the object, and the like.

In addition, in the exemplary embodiment, in the case where the user performs processing on image data stored in the image processing apparatus 10, for example, a thumbnail image and a setting button are displayed on the display 104, the setting button being a button for setting the content of processing for a document file represented by the thumbnail image. Here, a thumbnail image is an image illustrating a print image of a document file and is an image of a predetermined size to which the size of a document image of a certain page included in the document file is reduced. For example, a thumbnail image is created by reducing a document image of page 1 of a document file or thumbnail images are created by reducing document images of the pages of the document file. The user selects a thumbnail image on the display 104, and may apply settings of a setting button to the selected thumbnail image by performing an operation on the selected thumbnail image on the screen. In the exemplary embodiment, a thumbnail image is used as an example of a target image. In addition, a setting button is used as an example of a processing image.

The controller 100 serving as an example of a controller performs control on the functional units provided in the image processing apparatus 10. Here, the controller 100 includes a central processing unit (CPU) 101, a read-only memory (ROM) 102, and a random-access memory (RAM) 103.

The ROM 102 stores a control program, which is executed by the CPU 101. The CPU 101 reads the control program stored in the ROM 102, and executes the control program using the RAM 103 as a work area. When the control program is executed by the CPU 101, the functional units of the image processing apparatus 10 are controlled.

In addition, the controller 100 controls the display 104 such that the display 104 is caused to display images, and performs processing in accordance with an operation received through the display 104 from the user. Here, the controller 100 determines the type of a touch operation performed on the display on the basis of the position touched by the user on the display 104, and receives the determined touch operation as an input from the user.

For example, there are "tap", "drag", "release", "flick", "long tap", and the like as touch operations performed on the display. In addition, an operation performed with a finger of the user through a touch of a screen will be explained as a touch operation in the following explanation; however, instead of a finger of the user, for example, an operation performed with a touch pen held by the user through a touch of the screen may also be a touch operation.

"Tap" refers to an operation in which the screen is touched by a finger of the user. "Drag" refers to an operation in which the user moves their finger while touching the screen with their finger. "Release" refers to an operation in which the user lifts their finger such that their finger is away from the screen from the state in which the screen is touched by their finger. "Flick" refers to an operation in which the user removes their finger by a quick jerky movement from the state in which the screen is touched by their finger. "Long tap" refers to an operation in which the user keeps touching a certain point or a certain area on the screen for a predetermined time period.

Then, for example, when the user performs a long tap operation on a thumbnail image displayed on the screen of the display 104, the controller 100 detects a touch on the screen and determines that the touch operation performed on the screen is a long tap. Then, the controller 100 performs certain processing assuming that a thumbnail image present at the position touched has been selected. In addition, for example, when the user performs a drag operation for a thumbnail image displayed on the screen, the controller 100 determines that a touch operation performed on the screen is dragging and performs certain processing assuming that a drag operation has been performed to move the thumbnail image present at the position touched.

Furthermore, when a thumbnail image displayed on the screen of the display 104 is selected and a drag operation is received for the selected thumbnail image, the controller 100 calculates a direction in which a finger of the user has been moved from the point touched when dragging is started, in accordance with the amount of travel of the finger from the point touched when dragging is started (hereinafter referred to as a drag direction). Then, the controller 100 determines whether or not a setting button is displayed in the calculated drag direction from the point touched when dragging is started. In the case where a setting button is displayed, the controller 100 further determines whether or not settings of the displayed setting button are applicable to the selected thumbnail image. In the case where the settings of the setting button are applicable to the selected thumbnail image, the controller 100 performs processing in which the setting button is moved to a position near a display position of the selected thumbnail image.

That is, upon receiving a drag operation for moving the selected thumbnail image toward a display position of the setting button, the controller 100 performs processing in which the setting button is moved toward the display position of the selected thumbnail image, in the case where the settings of the setting button are applicable to the selected thumbnail image. Here, at the time when a movement direction of the selected thumbnail image (the drag direction) is determined through the drag operation, the controller 100 performs processing in which the setting button displayed in the movement direction is moved toward the display position of the selected thumbnail image.

Note that, for example, in the case where the user has changed the drag direction and performed a drag operation in a direction different from the direction in which the setting button has been moved, the controller 100 removes display of the setting button, which has been moved, assuming that the user does not want to perform an operation on the setting button. In such a case, for example, after change of the drag direction, when another setting button is displayed in a drag direction obtained after the change, the controller 100 performs processing in which the other setting button is moved.

Likewise, in the case where the user has performed a drag operation for moving their finger past the setting button, which has been moved, the controller 100 removes display of the setting button, which has been moved, assuming that the user does not want to perform an operation on the setting button.

In contrast, upon determining that, for example, a release operation has been performed within the setting button, which has been moved, the controller 100 performs processing in which the settings of the setting button are applied to the selected thumbnail image.

Note that a program executed by the CPU 101 may be provided in a state in which the program is stored in a computer readable recording medium, examples of which include magnetic recording mediums (a magnetic tape, a magnetic disk, and the like), optical recording mediums (an optical disk and the like), magneto-optical recording mediums, semiconductor memory devices, and the like. In addition, the program may also be downloaded into the image processing apparatus 10 via a way of communication such as the Internet.

The image reading unit 105 is equipped with an image reading apparatus (a scanner apparatus) that reads a document and that creates image data representing images of the read document, and outputs the created image data to the image processing unit 107.

The image forming unit 106 serving as an example of an image forming unit is equipped with an image forming mechanism that performs a print process in which a toner image corresponding to image data is formed on a sheet, which is an example of a recording material, for example, by an electrophotographic system or the like.

The image processing unit 107 performs a certain image process on input image data, examples of the image process including color correction, tone correction, and the like. The image processing unit 107 outputs image data on which the certain image process has been performed, to the image forming unit 106.

The communication unit 108 is connected to a communication line, which is not illustrated, and functions as a communication interface that performs communication with other apparatuses connected to the communication line.

The memory 109 is equipped with a memory device such as a hard disk drive, and stores, for example, data received by the communication unit 108 and data created by the image processing apparatus 10.

<Explanation of Screen Displayed on Display>

Next, a screen displayed on the display 104 will be explained.

Figure 2A:
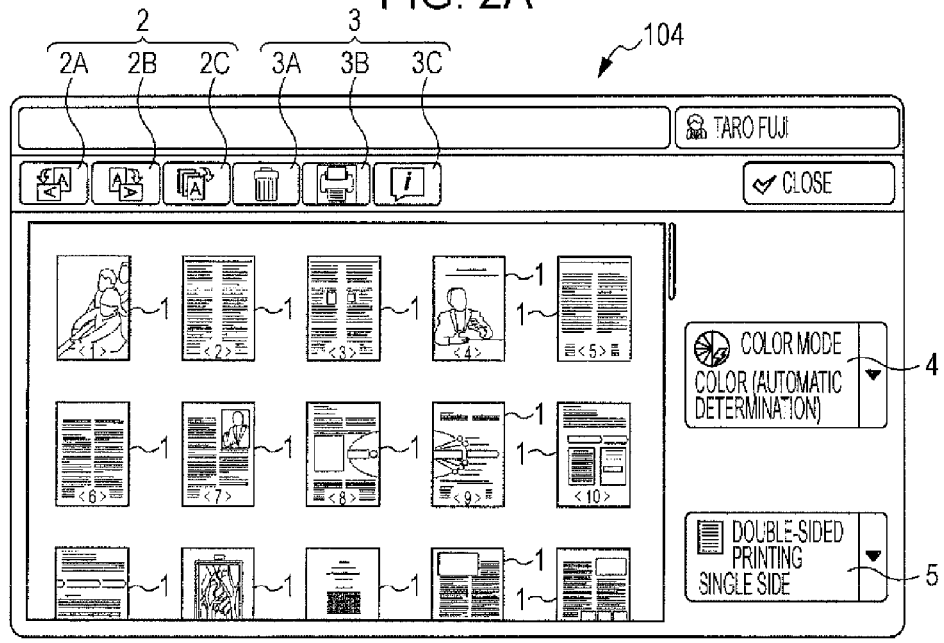
FIGS. 2A and 2B are diagrams for explaining an example of a screen displayed when a user performs processing on image data.
Figure 2B:
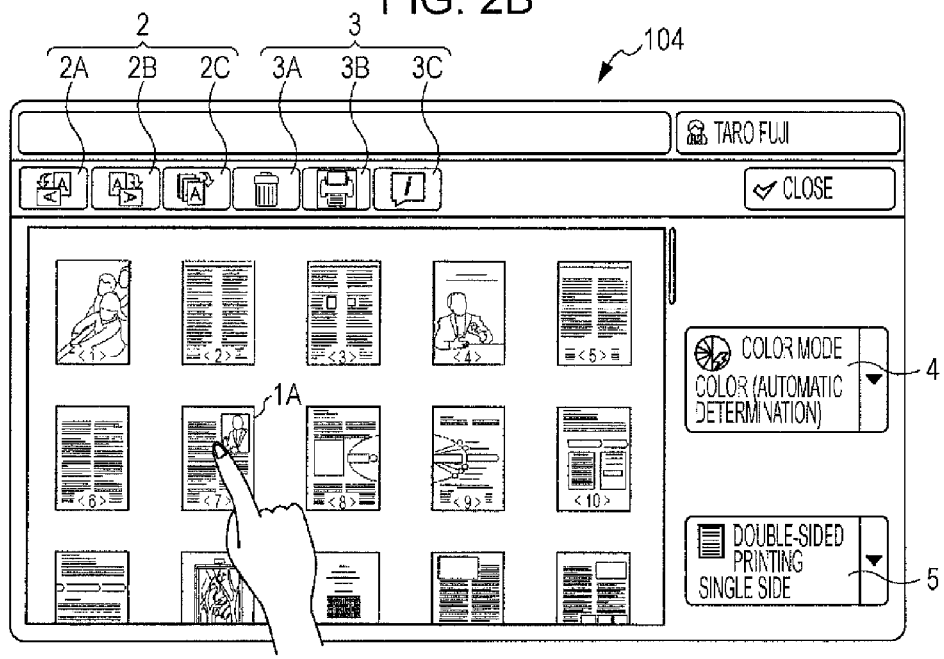

FIGS. 2A and 2B are diagrams for explaining an example of a screen displayed when the user performs processing on image data. When the user performs, for example, processing on image data such as printing, the screen illustrated in FIG.

2A is normally displayed on the display 104. Plural thumbnail images 1 and plural setting buttons are displayed on the screen illustrated in FIG. 2A.

As setting buttons, there are provided, on the screen illustrated in FIG. 2A, a setting button for rotating a processing-target image counterclockwise by 90 degrees (hereinafter referred to as a counterclockwise-rotation button 2A), a setting button for rotating a processing-target image clockwise by 90 degrees (hereinafter referred to as a clockwise-rotation button 2B), and a setting button for rotating all thumbnail images clockwise by 90 degrees in a collective manner (hereinafter referred to as an entire clockwise-rotation button 2C). In the following, the counterclockwise-rotation button 2A, the clockwise-rotation button 2B, and the entire clockwise-rotation button 2C may also be collectively called a rotation button 2.

In addition, as setting buttons, there are provided, on the screen illustrated in FIG. 2A, a setting button for removing a processing-target image (hereinafter referred to as a remove button 3A), a setting button for printing a processing-target image (hereinafter referred to as a print button 3B), and a setting button for displaying an explanation of processing to be performed on a processing-target image (hereinafter referred to as an explanation button 3C). In the following, the remove button 3A, the print button 3B, and the explanation button 3C may also be collectively called a processing button 3.

Furthermore, there are provided, on the screen illustrated in FIG. 2A, a setting button for setting colors for printing (hereinafter referred to as a color setting button 4) and a setting button for setting single-sided printing or double-sided printing (hereinafter referred to as a side setting button 5).

Then, as illustrated in FIG. 2B, in the case where the user selects one of the plural thumbnail images 1, when the user performs, for example, a long tap operation by pressing down a thumbnail image 1A, which is one of the plural thumbnail images 1, with their finger, the thumbnail image 1A becomes selected.

Next, a screen obtained when the user performs a drag operation for a selected thumbnail image will be explained.

FIGS. 3A and 3B are diagrams illustrating an example of a screen obtained when a drag operation is performed for the thumbnail image 1A. After selecting the thumbnail image 1A on the screen, for example, as illustrated in FIG. 3A, when the user presses down the thumbnail image 1A and performs a drag operation in the direction where the rotation button 2 is displayed (a direction indicated by an arrow S1), the rotation button 2 is moved to a position near the display position of the thumbnail image 1A (moved in a direction indicated by an arrow T1). Regions encircled by a broken line illustrated in FIG. 3A are regions where the rotation button 2 has been displayed, and illustrate a path from the position where the rotation button 2 is initially displayed to the position near the display position of the thumbnail image 1A. In addition, assume that although the thumbnail image 1A is not moved in FIGS. 3A and 3B, the thumbnail image 1A, a copied image of the thumbnail image 1A, or the like is moved through a drag operation.

Here, the controller 100 determines that a drag operation is being performed for the thumbnail image 1A selected through a long tap operation and calculates the drag direction in accordance with the amount of travel of the finger from the point touched when dragging is started. Then, the controller 100 determines that the rotation button 2 is displayed in the calculated drag direction from the point touched when dragging is started, and performs processing in which the rotation button 2 is moved to the position near the display position of the thumbnail image 1A. Note that, for example, in the case where a processing-target image corresponding to the thumbnail image 1A is not set to be rotated, the controller 100 determines that the settings of the rotation button 2 are inapplicable to the thumbnail image 1A. In such a case, even when the user performs a drag operation as illustrated in FIG. 3A, the controller 100 does not perform processing in which the rotation button 2 is moved.

In addition, in the example illustrated in FIG. 3A, the controller 100 moves the rotation button 2 including the counterclockwise-rotation button 2A, the clockwise-rotation button 2B, and the entire clockwise-rotation button 2C; however, the controller 100 is not limited to a controller configured in this manner. In the example illustrated in FIG. 3A, the controller 100 moves three setting buttons together, which are the counterclockwise-rotation button 2A, the clockwise-rotation button 2B, and the entire clockwise-rotation button 2C, by treating the three setting buttons as buttons having functions similar to one another. However, for example, the controller 100 may have a configuration with which only the counterclockwise-rotation button 2A is moved or the counterclockwise-rotation button 2A and the clockwise-rotation button 2B are moved. In addition, for example, in the case where another setting button is present in addition to the rotation button 2 in the drag direction for the thumbnail image 1A, the controller 100 may also move the other setting button together with the rotation button 2. In this manner, the number of setting buttons moved by the controller 100 may be one or more than one.

Furthermore, in the example illustrated in FIG. 3A, the controller 100 moves the rotation button 2, which is displayed; however, the controller 100 is not limited to a controller configured in this manner. For example, the controller 100 may let the rotation button 2, which is displayed, be displayed at its position, copy the rotation button 2, and move the rotation button 2 obtained as a result of copying.

In addition, the example illustrated in FIG. 3B is an example in which the processing button 3 is moved. After selecting the thumbnail image 1A on the screen, for example, as illustrated in FIG. 3B, when the user presses down the thumbnail image 1A and performs a drag operation in the direction where the processing button 3 is displayed (a direction indicated by an arrow S2), the processing button 3 is moved to a position near the display position of the thumbnail image 1A (moved in a direction indicated by an arrow T2) similarly as in the case of FIG. 3A.

Next, another example of a screen obtained when the user performs a drag operation for a selected thumbnail image will be explained.

Figure 4A:
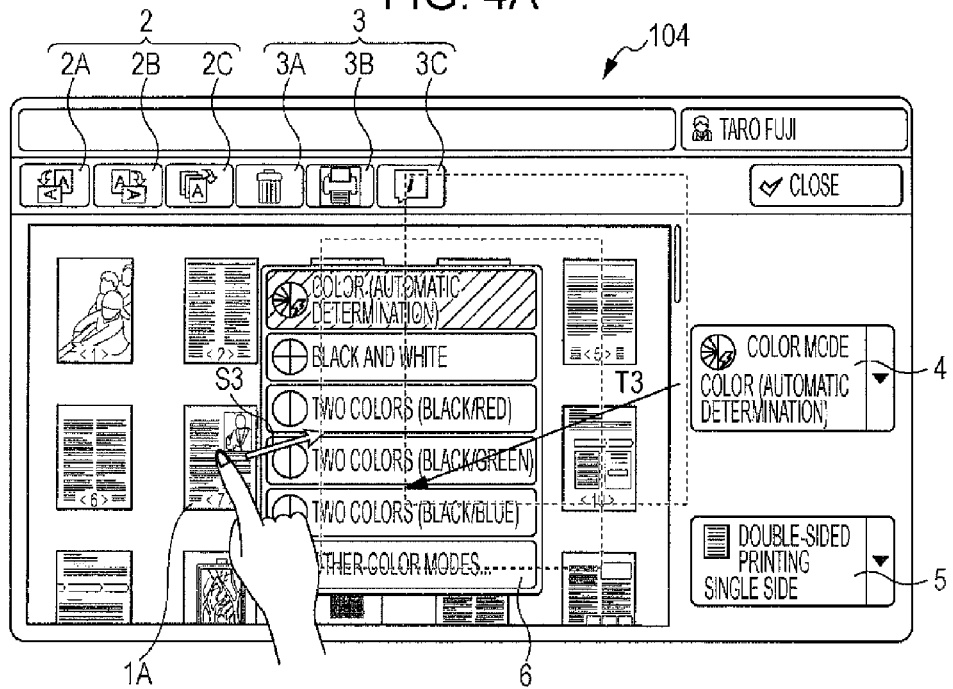
FIGS. 4A and 4B are diagrams illustrating an example of a screen in the case where a setting list is moved when a drag operation is performed for the thumbnail image.
Figure 4B:
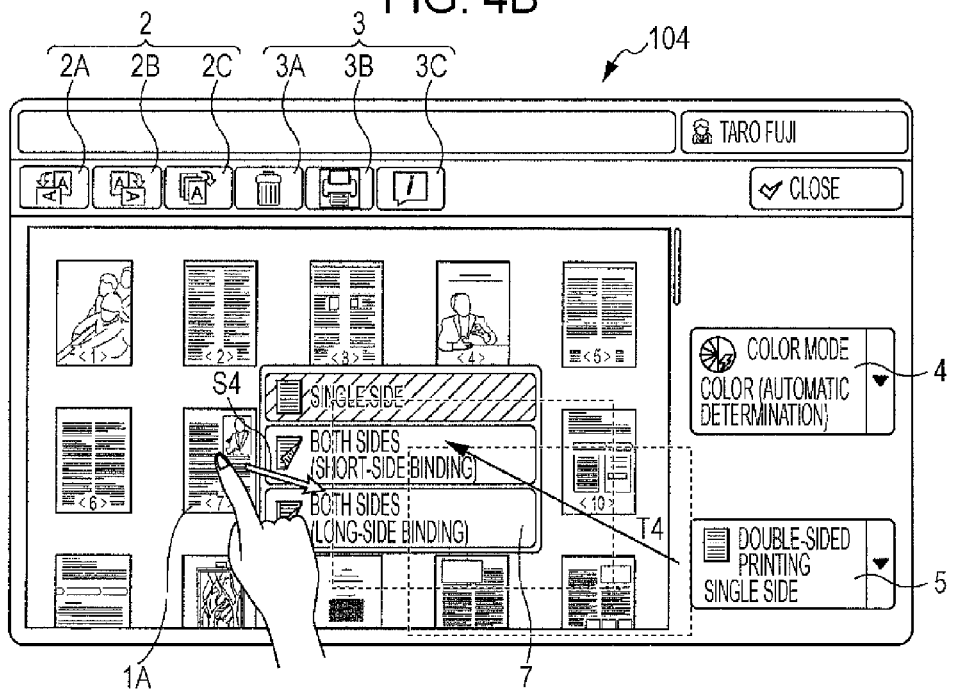

FIGS. 4A and 4B are diagrams illustrating an example of a screen in the case where a setting list is moved when a drag operation is performed for the thumbnail image 1A. A setting list is a list of selectable setting items set for a setting button, and is displayed when a user selects (presses down) the setting button.

For example, when the user selects the color setting button 4, a color setting list 6 illustrated in FIG. 4A is displayed like a pop-up menu that appears in the foreground of the screen. In the color setting list 6, as color settings for printing, items such as "color (automatic determination)", "black and white", "two colors (black/red)", "two colors (black/green)", "two colors (black/blue)", and "other color modes" are displayed as selectable setting items. In addition, when the user selects the side setting button 5, a side setting list 7 illustrated in FIG. 4B is displayed like a pop-up menu. In the side setting list 7, as print-format settings for printing, items such as "single-sided printing", "double-sided printing (short-side binding)", and "double-sided printing (long-side binding)" are displayed as selectable setting items. Note that some setting buttons are setting buttons that do not have setting lists such as the rotation button 2.

Then, after selecting the thumbnail image 1A on the screen, for example, as illustrated in FIG. 4A, when the user presses down the thumbnail image 1A and performs a drag operation in the direction where the color setting button 4 is displayed (a direction indicated by an arrow S3), the color setting list 6 is moved to a position near the display position of the thumbnail image 1A from the position where the color setting button 4 is displayed (moved in a direction indicated by an arrow T3). In addition, after selecting the thumbnail image 1A on the screen, for example, as illustrated in FIG. 4B, when the user presses down the thumbnail image 1A and performs a drag operation in the direction where the side setting button 5 is displayed (a direction indicated by an arrow S4), the side setting list 7 is moved to a position near the display position of the thumbnail image 1A from the position where the side setting button 5 is displayed (moved in a direction indicated by an arrow T4).

In this manner, for setting buttons that have setting lists, the controller 100 may also move not a setting button but a setting list of the setting button.

Next, another example of a screen obtained when the user performs a drag operation for a selected thumbnail image will be explained.

Figure 5:
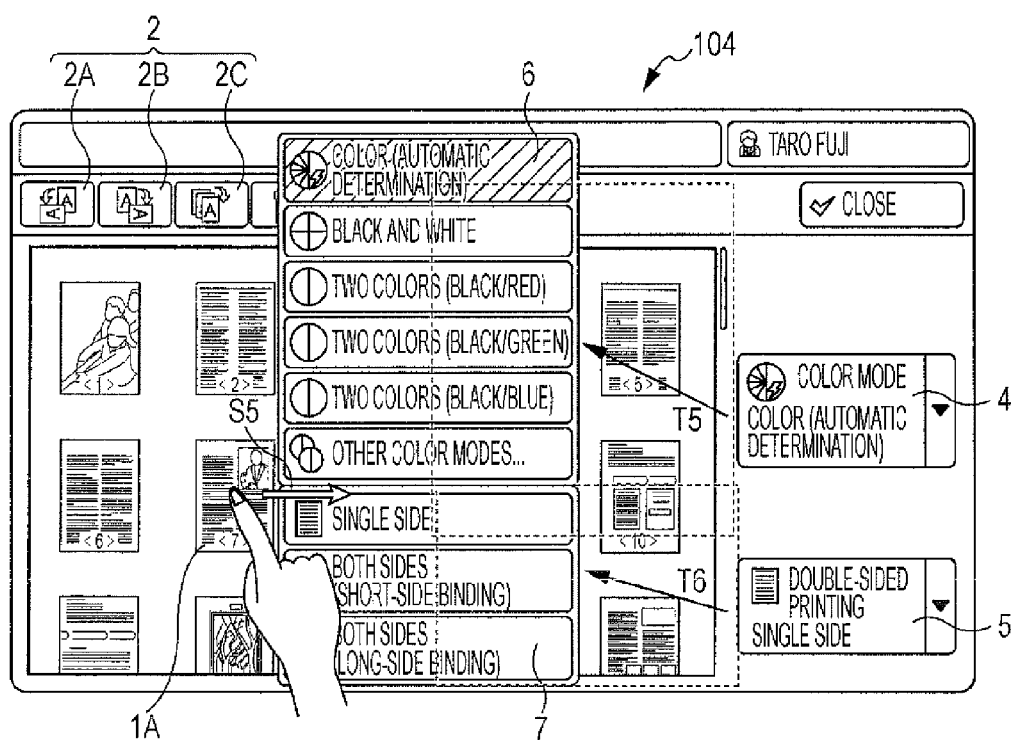
FIG. 5 is a diagram illustrating an example of a screen in the case where two setting lists are moved when a drag operation is performed for the thumbnail image.

FIG. 5 is a diagram illustrating an example of a screen in the case where two setting lists are moved when a drag operation is performed for the thumbnail image 1A. After selecting the thumbnail image 1A, for example, as illustrated in FIG. 5, when the user presses down the thumbnail image 1A and performs a drag operation in the direction between the color setting button 4 and the side setting button 5 (a direction indicated by an arrow S5), both the color setting list 6 and the side setting list 7 are moved to a position near the display position of the thumbnail image 1A. That is, the color setting list 6 is moved in a direction indicated by an arrow T5 and the side setting list 7 is moved in a direction indicated by an arrow T6.

In this manner, in the case where the direction in which a thumbnail image is dragged is a direction between plural displayed setting buttons, the controller 100 may also move plural setting lists. In addition, here, the example has been explained in which plural setting lists are moved; however, plural setting buttons may also be moved.

Figure 6A:
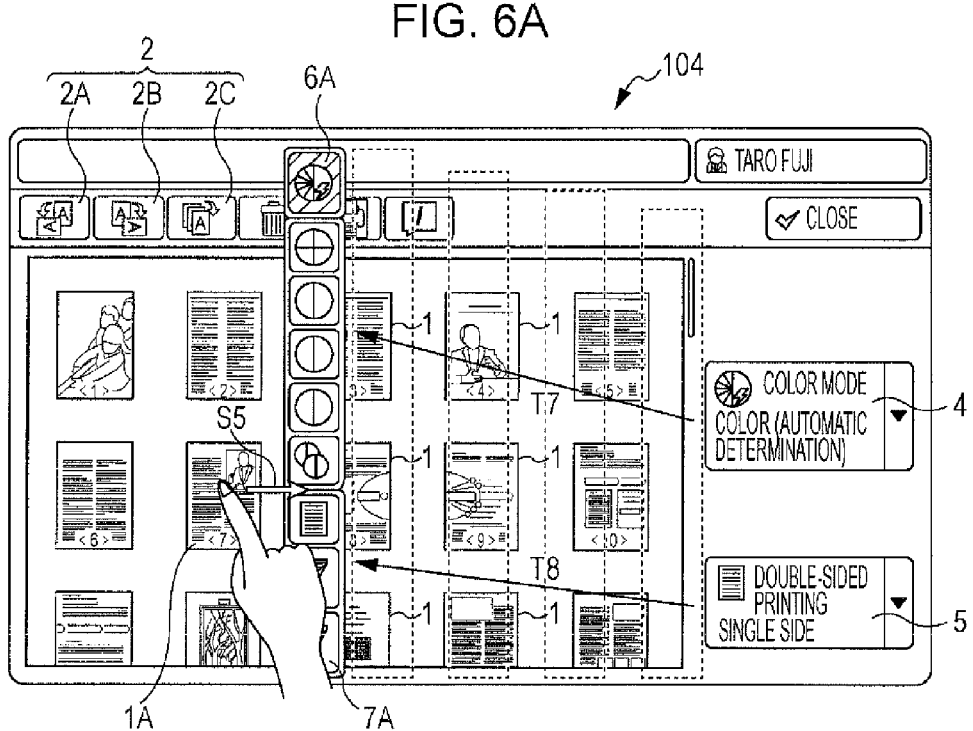
FIGS. 6A and 6B are diagrams illustrating another example of a screen in the case where two setting lists are moved when a drag operation is performed for the thumbnail image.
Figure 6B:
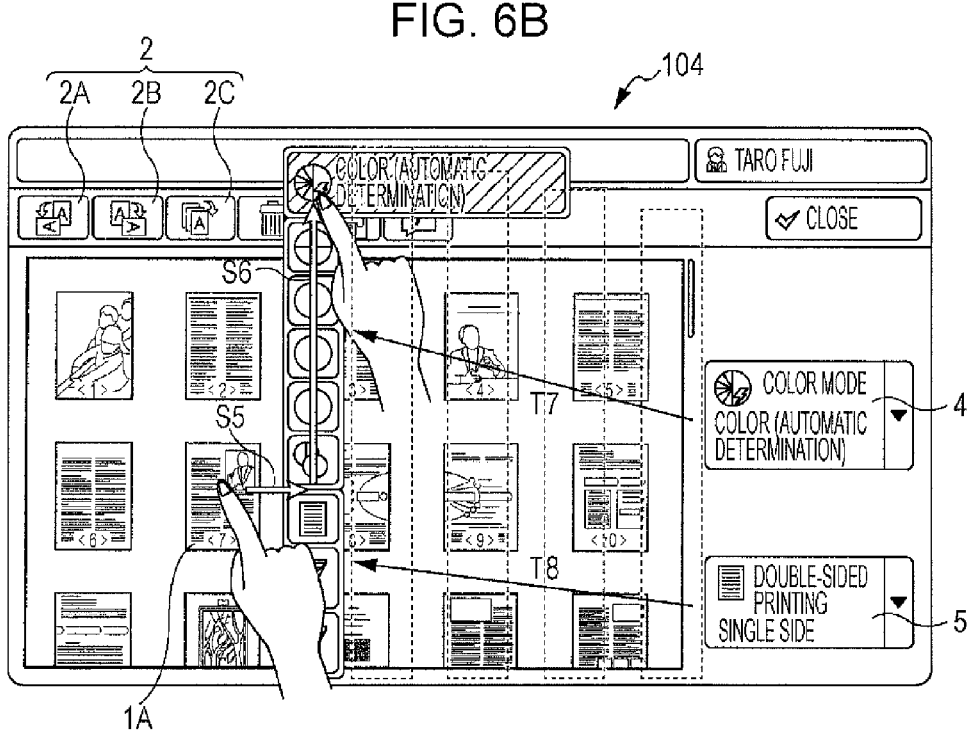

FIGS. 6A and 6B are diagrams illustrating another example of a screen in the case where two setting lists are moved when a drag operation is performed for the thumbnail image 1A.

When setting lists are moved as illustrated in FIG. 5, there may be the case where the setting lists overlap thumbnail images 1, which are originally displayed, and thus display of the thumbnail images 1 is hidden. Thus, the controller 100 may also display settings lists in a reduced size as illustrated in FIGS. 6A and 6B.

In the example illustrated in FIG. 6A, for items in the setting lists, the controller 100 displays the setting lists in a reduced size by displaying only images each of which representing the content of a corresponding one of the items. After selecting the thumbnail image 1A on the screen, for example, as illustrated in FIG. 6A, when the user presses down the thumbnail image 1A and performs a drag operation in the direction between the color setting button 4 and the side setting button 5 (the direction indicated by the arrow S5), the color setting list 6 and the side setting list 7 illustrated in FIG. 5 are displayed in a reduced size (a color setting list 6A and a side setting list 7A illustrated in FIG. 6A) and moved to a position near the display position of the thumbnail image 1A. That is, the color setting list 6A is moved in a direction indicated by an arrow T7 and the side setting list 7A is moved in a direction indicated by an arrow T8.

In this manner, display of the thumbnail images 1 is not hidden by displaying setting lists in a reduced size.

Then, for example, when the user moves their finger to one of the items of a certain setting list, the entirety of the content of the selected item is displayed as illustrated in FIG. 6B. In the example illustrated in FIG. 6B, an item of "color" is selected when the user performs a drag operation in a direction indicated by an arrow S6 and moves their finger to an image representing the item of "color", and characters "color (automatic determination)" are displayed next to the image.

Next, a screen will be explained on which an indicator is displayed when the user performs a drag operation for a selected thumbnail image. Here, an indicator is an image displayed between a thumbnail image 1 and another thumbnail image 1, and is an image for rearranging the position of the thumbnail image 1A among the plural thumbnail images 1. In the exemplary embodiment, an indicator is used as an example of an indication image.

Figure 7A:
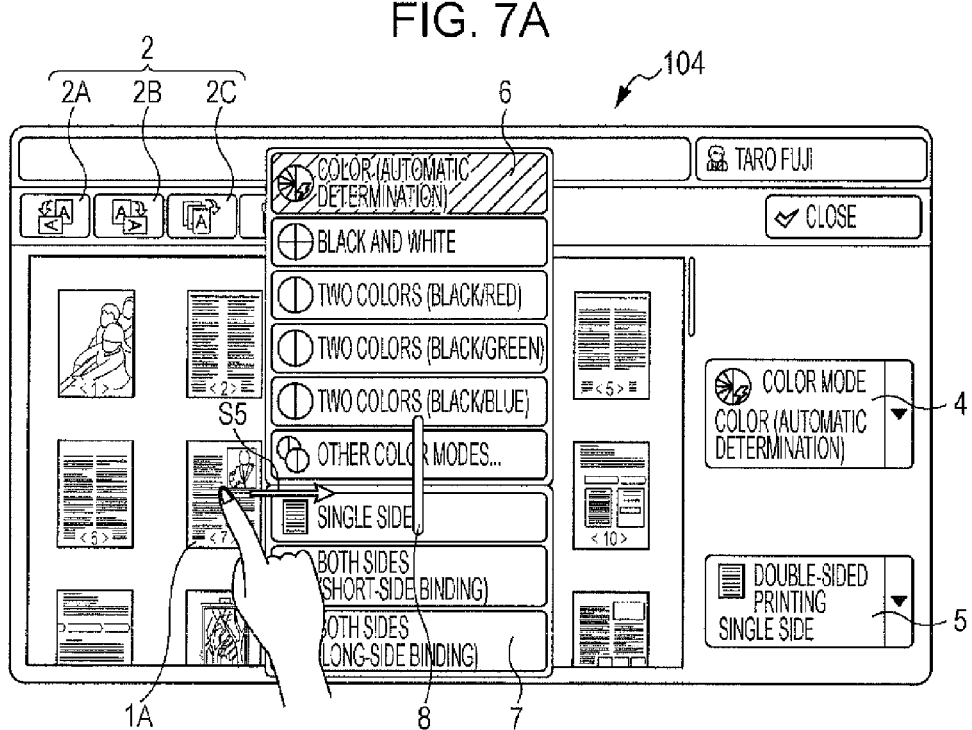
FIGS. 7A and 7B are diagrams illustrating an example of a screen on which an indicator is displayed when a drag operation is performed for the thumbnail image.
Figure 7B:
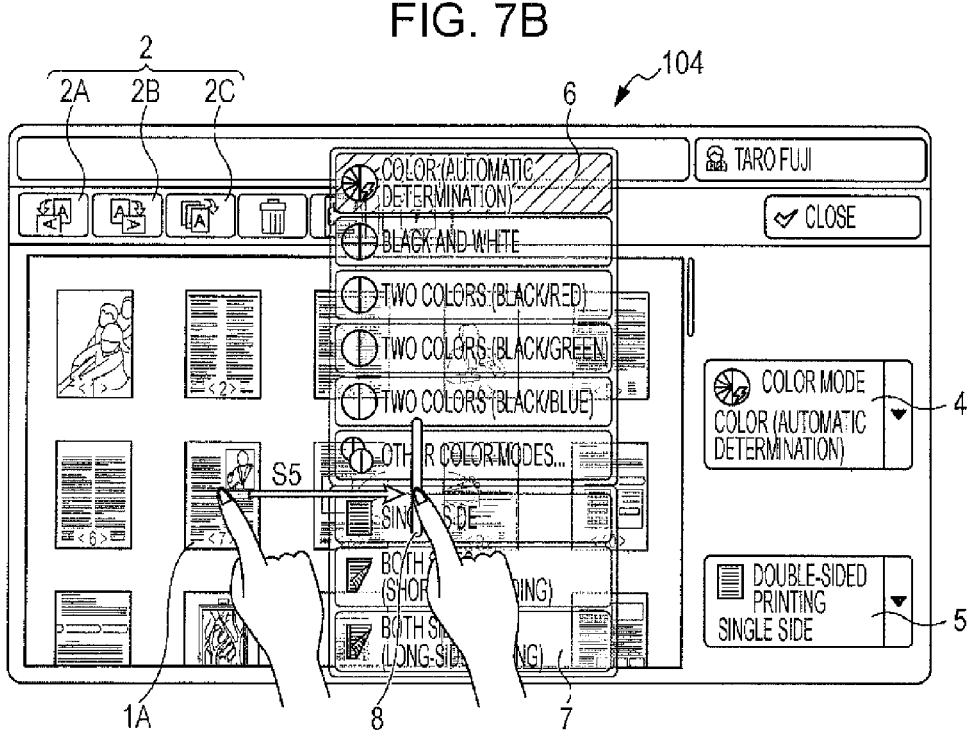

FIGS. 7A and 7B are diagrams illustrating an example of a screen on which an indicator 8 is displayed when a drag operation is performed for the thumbnail image 1A. After selecting the thumbnail image 1A, for example, as illustrated in FIG. 7A, when the user presses down the thumbnail image 1A and performs a drag operation in the direction between the color setting button 4 and the side setting button 5 (the direction indicated by the arrow S5), both the color setting list 6 and the side setting list 7 are moved to a position near the display position of the thumbnail image 1A.

Normally, in the case where the user performs an operation for rearranging the position of the thumbnail image 1A, a process in which the thumbnail image 1A is moved to a position where a release operation is performed by the user performing a drag operation for the thumbnail image 1A and performing a release operation between a certain thumbnail image 1 and another thumbnail image 1. In the exemplary embodiment, in the case where the user performs such an operation, setting lists are moved to a position near the display position of the thumbnail image 1A as illustrated in FIG. 7A. There may be the case where the setting lists overlap thumbnail images 1, which are originally displayed, and thus display of the thumbnail images 1 is hidden.

When display of the thumbnail images 1 is hidden, it becomes more difficult for the user to perform an operation for rearranging the position of the thumbnail image 1A. Thus, as illustrated in FIG. 7A, the controller 100 displays the indicator 8 between a certain hidden thumbnail image 1 and another hidden thumbnail image 1. In the example illustrated in FIG. 7A, for the thumbnail images 1 present in the drag direction, the indicator 8 is displayed between a certain thumbnail image 1 and another thumbnail image 1. In addition, for the indicator 8, for example, display of the indicator 8 may also be performed when conditions are satisfied, examples of which include the case where a time period during which the user presses down a setting list exceeds a predetermined time period and the like.

Furthermore, as illustrated in FIG. 7B, the controller 100 may also increase the transparency of images of the setting lists and display the thumbnail images 1 behind the setting lists in a visible manner. In addition, in the example illustrated in FIG. 7B, in the case where the user touches the indicator 8 with their finger in a state where the user presses down the thumbnail image 1A and then a drag operation is performed for the thumbnail image 1A, the thumbnail images 1 behind the setting lists are displayed in a visible manner. In this manner, when predetermined conditions are satisfied, the thumbnail images 1 may also be displayed in a visible manner. As another example of conditions here, for example, the case is conceivable where a time period during which the user presses down a setting list exceeds a predetermined time period or the like.

Then, when the user performs a release operation on the indicator 8, the controller 100 performs a process in which the position of the thumbnail image 1A is rearranged, by moving the thumbnail image 1A to the position where the indicator 8 is displayed, that is, the position between a certain thumbnail image 1 and another thumbnail image 1.

In addition, in the example illustrated in FIGS. 7A and 7B, the controller 100 displays one indicator 8 between a certain thumbnail image 1 and another thumbnail image 1 present in the drag direction; however, the controller 100 is not limited to a controller configured in this manner. For example, the controller 100 may also display indicators 8 at all the positions each of which is between a corresponding one of and another one of the thumbnail images 1 hidden by the setting lists.

Furthermore, in the example illustrated in FIGS. 7A and 7B, the controller 100 displays the indicator 8 on the setting lists; however, in the case where a setting button overlaps a thumbnail image 1 and display of the thumbnail image 1 is hidden, the indicator 8 may also be displayed on the setting button.

<Explanation of Processing Procedure for Moving Setting Button>

Figure 8:
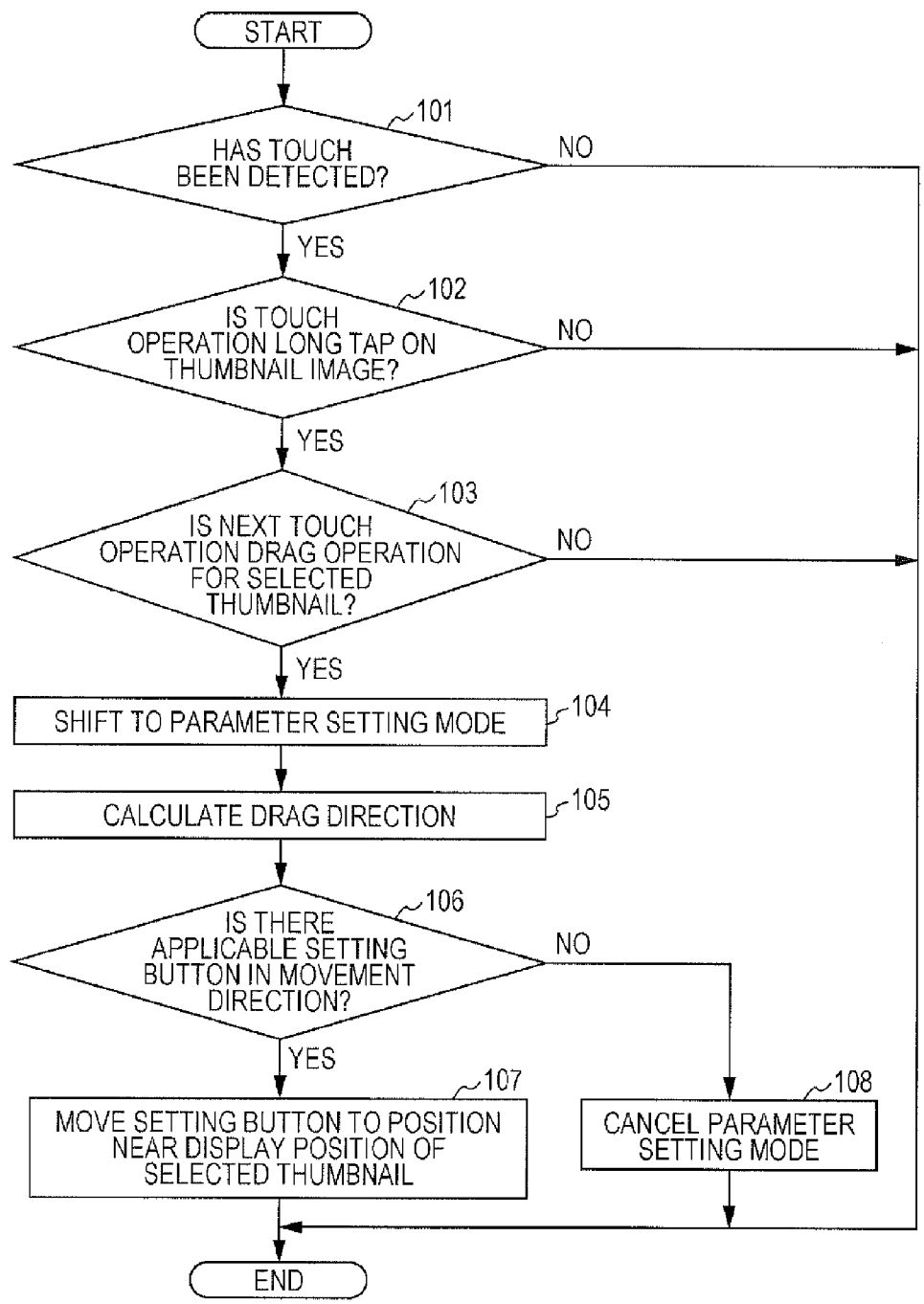
FIG. 8 is a flowchart illustrating an example of a processing procedure in which a controller moves a certain setting button.

Next, a process will be explained in which the controller 100 moves a certain setting button. FIG. 8 is a flowchart illustrating an example of a processing procedure in which the controller 100 moves a certain setting button. In the processing procedure illustrated in FIG. 8, as an initial state, assume that the screen illustrated in FIG. 2A is displayed on the display 104 as a screen displayed when the user performs a certain process on image data.

First, the controller 100 determines whether or not a touch has been detected on the display 104 (Step 101). In the case where a touch has not been detected (No in Step 101), the flow of the processing procedure ends. In contrast, in the case where a touch has been detected, the controller 100 determines whether or not a touch operation is a long tap operation performed on a certain thumbnail image displayed on the display 104 (Step 102). In the case where the touch operation is a long tap operation performed on a certain thumbnail image (Yes in Step 102), the controller 100 determines whether or not the next touch operation is a drag operation performed for the thumbnail image selected through the long tap (hereinafter referred to as a selected thumbnail) (Step 103). In the case where a drag operation has been performed for the selected thumbnail (Yes in Step 103), the controller 100 causes a current mode to shift to a "parameter setting mode", which is a mode in which settings are set for a thumbnail image (Step 104).

In contrast, in the case where the touch operation is not a long tap performed on a certain thumbnail image (No in Step 102) or in the case where a touch operation performed after a long tap is not a drag operation for the selected thumbnail (No in Step 103), the flow of the processing procedure ends. For example, in the case where it is determined in Step 102 or in Step 103 that the touch operation is a tap operation performed on the selected thumbnail, the controller 100 performs a process in which details of the thumbnail image selected through the tap are displayed. In addition, for example, in the case where it is determined in Step 102 or in Step 103 that the touch operation is a drag operation performed on an area where thumbnail images are not displayed, the controller 100 causes the current mode to shift to a "page scroll mode". The page scroll mode is a mode in which a so-called scroll process is performed in which an entire image displayed on the display 104 is scrolled.

Next, after the current mode is caused to shift to the parameter setting mode, the controller 100 calculates a drag direction in accordance with the amount of travel of a finger from the point touched when dragging is started (Step 105). Then, the controller 100 determines whether or not a setting button applicable to the selected thumbnail is displayed in the calculated drag direction from the point touched when dragging is started (Step 106).

In the case where an applicable setting button is displayed (Yes in Step 106), the controller 100 performs a process in which the applicable setting button is moved to a position near the display position of the selected thumbnail and the flow of the processing procedure ends (Step 107). In contrast, in the case where an applicable setting button is not displayed (No in Step 106), the controller 100 does not perform a process in which a setting button is moved and cancels the parameter setting mode (Step 108), and the flow of the processing procedure ends.

<Explanation of Processing Procedure for Applying Settings of Setting Button>

Figure 9:
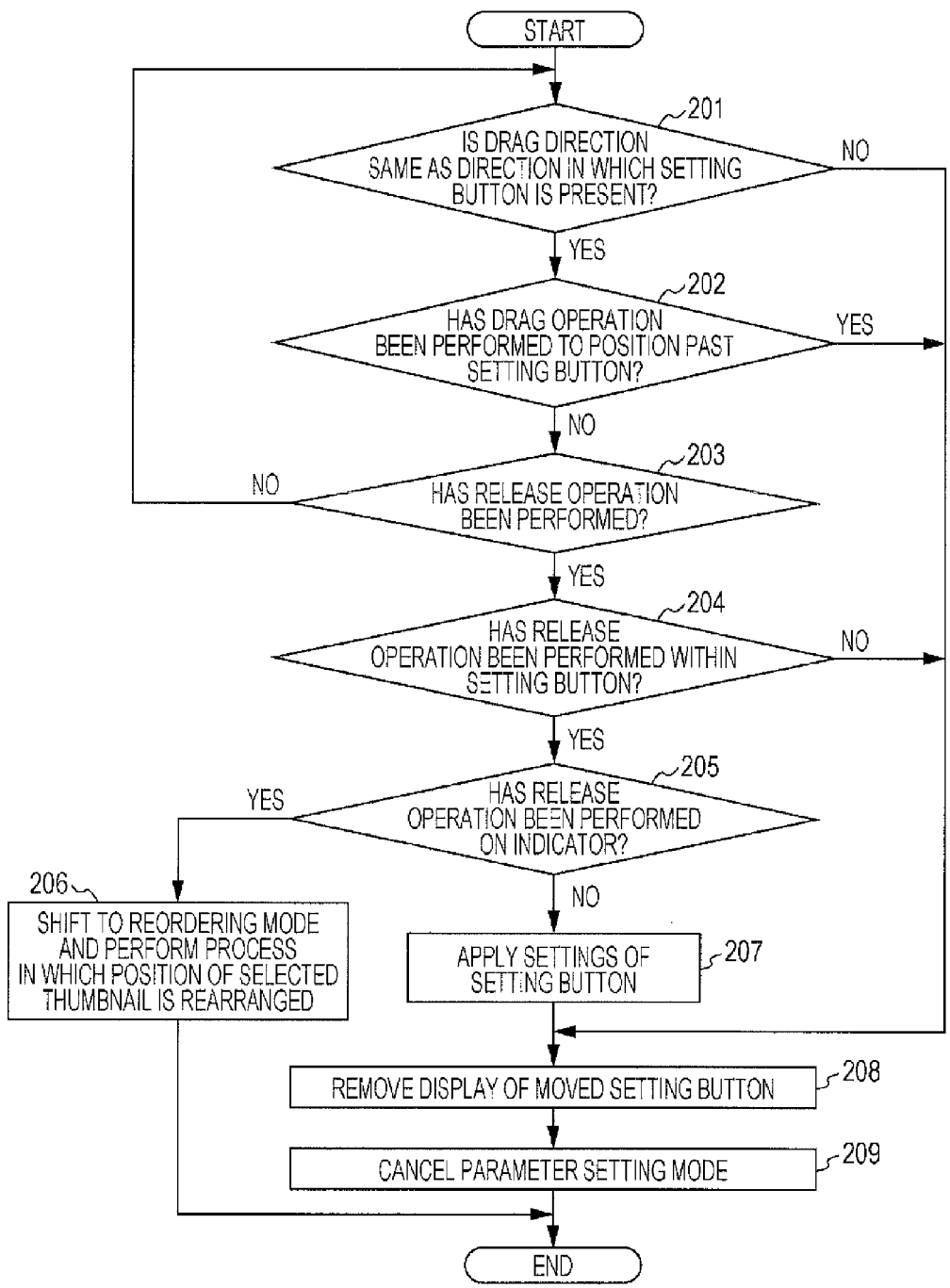
FIG. 9 is a flowchart illustrating an example of a processing procedure in which the controller applies settings of a certain setting button to a certain thumbnail image.

Next, a process will be explained in which the controller 100 applies settings of a certain setting button to a certain thumbnail image. FIG. 9 is a flowchart illustrating an example of a processing procedure in which the controller 100 applies settings of a certain setting button to a certain thumbnail image. In the processing procedure illustrated in FIG. 9, as an initial state, assume that the user has performed a drag operation for a selected thumbnail, the current mode has been shifted to the parameter setting mode in Step 104 of FIG. 8, and, in Step 107, a certain setting button is in a state in which the setting button has been moved to a position near the display position of the selected thumbnail.

First, the controller 100 determines whether or not the drag direction is the same as a direction in which the setting button, which has been moved, is present (Step 201). In the case where the drag direction is the same as the direction (Yes in Step 201), the controller 100 determines whether or not a drag operation has been performed in which a finger is moved past the setting button, which has been moved, (Step 202). In the case where such a drag operation has not been performed (No in Step 202), the controller 100 determines whether or not a release operation has been performed (Step 203). In contrast, in the case where No is obtained in Step 201 or in the case where Yes is obtained in Step 202, the flow proceeds to Step 208.

Next, in the case where a release operation has been performed (Yes in Step 203), the controller 100 determines whether or not the release operation has been performed within the setting button, which has been moved, (Step 204). In contrast, in the case where a release operation has not been performed (No in Step 203), the flow proceeds to Step 201 and the controller 100 performs determination in Steps 201 and 202 again.

In addition, in the case where the release operation is not performed within the setting button (No in Step 204), the flow proceeds to Step 208, which will be described later. In contrast, in the case where the release operation has been performed within the setting button (Yes in Step 204), the controller 100 determines whether or not the release operation has been performed on an indicator (Step 205).

In the case where the release operation has been performed on the indicator (Yes in Step 205), the controller 100 causes the current mode to shift from the parameter setting mode to a reordering mode in which thumbnail images are reordered and executes a process in which the position of the selected thumbnail is rearranged (Step 206), and the flow of the processing procedure ends.

In contrast, in the case where the release operation has not been performed on the indicator (No in Step 205), the controller 100 performs a process in which settings are applied to the selected thumbnail, the settings corresponding to a position where the release operation has been performed within the setting button (Step 207). For example, in the case where the release operation has been performed on the print button 3B, the controller 100 performs a process in which a processing-target image corresponding to the selected thumbnail is printed. In addition, for example, in the case where the release operation has been performed on a setting item of "black and white" of the color setting list 6, the controller 100 sets settings of black-and-white printing for the processing-target image corresponding to the selected thumbnail. Next, the controller 100 removes display of the setting button, which has been moved, (Step 208) and cancels the parameter setting mode (Step 209), and the flow of the processing procedure ends.

<Another Example of Processing Procedure for Applying Settings of Setting Button>

In the processing procedure illustrated in FIG. 9, the case has been explained where the settings of the setting button are applied to the thumbnail image when the user performs a release operation within the setting button. Another example of a process will be explained in which the settings of a setting button are applied. FIG. 10 is a flowchart illustrating another example of a processing procedure in which the controller 100 applies settings of a certain setting button to a certain thumbnail image.

A target touch operation to be subjected to processing in the case of application of settings of a setting button in the processing procedure illustrated in FIG. 10 differs from that in the processing procedure illustrated in FIG. 9. In the processing procedure illustrated in FIG. 10, as an initial state, similarly to as in FIG. 9, assume that the user has performed a drag operation for a selected thumbnail, the current mode has been shifted to the parameter setting mode in Step 104 of FIG. 8, and, in Step 107, a certain setting button is in a state in which the setting button has been moved to a position near the display position of the selected thumbnail.

A process in Steps 301 to 306 is similar to the process in Steps 201 to 206 of FIG. 9, and thus the description thereof will be omitted here. Then, in the case where No is obtained in Step 305, that is, in the case where the controller 100 has determined that a release operation has not been performed on an indicator, the controller 100 maintains the position of the setting button, which has been moved, and determines whether or not a touch is detected on the display 104 within a predetermined time period (Step 307). Here, for example, the controller 100 uses a timer that measures a time period remaining until a predetermined time, in order to detect that a predetermined time period has elapsed. In the case where a touch is not detected within the predetermined time period (No in Step 307), the flow proceeds to Step 310, which will be described later.

In contrast, in the case where a touch has been detected within the predetermined time period (Yes in Step 307), the controller 100 determines whether or not a detected touch operation has been performed within the area of the setting button, which has been moved, (Step 308). Then, in the case where the detected touch operation has been performed within the area of the setting button (Yes in Step 308), the controller 100 performs a process in which the settings of the setting button are applied to the selected thumbnail (Step 309). In contrast, in the case where the detected touch operation is not performed within the area of the setting button (No in Step 308), the flow proceeds to Step 310, which will be described later.

Here, for example, in the case where an operation such as a tap, a long tap, or the like is performed within the setting button, settings corresponding to the position touched within the setting button are applied to the selected thumbnail. In addition, for example, in the case where the setting button has plural items and scrolling is possible within the setting button, when a flick operation is performed within the setting button, scrolling is executed and items are displayed in a sliding manner. In such a case, for example, when the user selects one of the plural items through a tap or the like, settings of the selected item are applied to the selected thumbnail. After applying the settings of the setting button, the controller 100 removes display of the setting button, which has been moved, (Step 310), and cancels the parameter setting mode (Step 311), and the flow of the processing procedure ends.

In addition, in Steps 304 and 305, the controller 100 determines a position where a release operation has been performed; however, for example, the flow may also proceed to Step 307 from Step 303 without determination of a position where a release operation has been performed. Then, for example, when an operation such as a tap is performed on a setting button within a predetermined time period, the controller 100 may perform processing in Step 309. When an operation such as a tap is performed on an indicator within a predetermined time period, the controller 100 may also perform processing in Step 306.

As described above, the image processing apparatus 10 according to the exemplary embodiment detects a touch operation performed by the user on the screen and performs, when a drag operation is performed for a thumbnail image, a process in which a setting button present in the drag direction is moved to a position near the display position of the thumbnail image. In the case where the user touches a touch panel and performs dragging, for example, the number of user operations is greater than that in the case where the user drags an image using an input device such as a mouse.

In addition, in the exemplary embodiment, the image processing apparatus 10 having a configuration including a touch panel has been explained; however, the configuration of the image processing apparatus 10 is not limited to such a configuration. For example, an operation may also be performed for a thumbnail image using a portable information terminal having a touch panel (a so-called smartphone, tablet, or the like). In such a case, a portable information terminal is connected to the image processing apparatus 10 via a network, and images represented by image data held by the image processing apparatus 10 are displayed on the touch panel of the portable information terminal. Then, settings are set for a thumbnail image displayed on the touch panel of the portable information terminal, by the user performing an operation on the thumbnail image. The contents of the settings are transmitted from the portable information terminal to the image processing apparatus 10, and, for example, printing such as color printing, double-sided printing, and the like is performed by the image processing apparatus 10.

Furthermore, settings are set for a thumbnail image illustrating a print image of a document file in the exemplary embodiment; however, images for which settings are set are not limited to thumbnail images. Settings may also be set for any kind of images as long as the images represent processing-target data.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control apparatus comprising:
    a display that displays a screen on which a target image and a processing image are arranged, the target image representing processing-target data, the processing image being an image for which a process to be performed on the processing-target data has been determined; and
    a controller that performs, in a case where an operation for moving the target image toward a position where the processing image is displayed has been received as a touch operation through the screen, control such that the processing image is moved toward a position where the target image is displayed.

2. The display control apparatus according to claim 1, wherein in a case where an operation for the processing image has been further received as a touch operation through the screen, the processing image having been moved toward the position where the target image is displayed, the controller applies a process determined for the processing image to data represented by the target image.

3. The display control apparatus according to claim 2, wherein in a case where the process determined for the processing image is applicable to the data represented by the target image, the controller performs control such that the processing image is moved toward the position where the target image is displayed, and in a case where the process determined for the processing image is inapplicable to the data represented by the target image, the controller prevents the processing image from being moved.

4. The display control apparatus according to claim 3, wherein the controller performs control such that, instead of the processing image, a list of processes determined for the processing image is moved toward the position where the target image is displayed.

5. The display control apparatus according to claim 4, wherein
    in a case where the operation for moving the target image toward the position where the processing image is displayed has been received as a touch operation through the screen, the display displays an indication image representing a position between target images that are different from the target image, and
    in a case where an operation for the indication image displayed on the display has been received as a touch operation through the screen, the controller performs control such that the target image for which the operation for moving the target image has been received is moved to the position between the target images and indicated by the indication image.

6. The display control apparatus according to claim 3, wherein
    in a case where the operation for moving the target image toward the position where the processing image is displayed has been received as a touch operation through the screen, the display displays an indication image representing a position between target images that are different from the target image, and
    in a case where an operation for the indication image displayed on the display has been received as a touch operation through the screen, the controller performs control such that the target image for which the operation for moving the target image has been received is moved to the position between the target images and indicated by the indication image.

7. The display control apparatus according to claim 2, wherein the controller performs control such that, instead of the processing image, a list of processes determined for the processing image is moved toward the position where the target image is displayed.

8. The display control apparatus according to claim 7, wherein
    in a case where the operation for moving the target image toward the position where the processing image is displayed has been received as a touch operation through the screen, the display displays an indication image representing a position between target images that are different from the target image, and
    in a case where an operation for the indication image displayed on the display has been received as a touch operation through the screen, the controller performs control such that the target image for which the operation for moving the target image has been received is moved to the position between the target images and indicated by the indication image.

9. The display control apparatus according to claim 2, wherein
    in a case where the operation for moving the target image toward the position where the processing image is displayed has been received as a touch operation through the screen, the display displays an indication image representing a position between target images that are different from the target image, and
    in a case where an operation for the indication image displayed on the display has been received as a touch operation through the screen, the controller performs control such that the target image for which the operation for moving the target image has been received is moved to the position between the target images and indicated by the indication image.

10. The display control apparatus according to claim 1, wherein in a case where the process determined for the processing image is applicable to data represented by the target image, the controller performs control such that the processing image is moved toward the position where the target image is displayed, and in a case where a process determined for the processing image is inapplicable to the data represented by the target image, the controller prevents the processing image from being moved.

11. The display control apparatus according to claim 10, wherein the controller performs control such that, instead of the processing image, a list of processes determined for the processing image is moved toward the position where the target image is displayed.

12. The display control apparatus according to claim 11, wherein in a case where the operation for moving the target image toward the position where the processing image is displayed has been received as a touch operation through the screen, the display displays an indication image representing a position between target images that are different from the target image, and in a case where an operation for the indication image displayed on the display has been received as a touch operation through the screen, the controller performs control such that the target image for which the operation for moving the target image has been received is moved to the position between the target images and indicated by the indication image.

13. The display control apparatus according to claim 10, wherein in a case where the operation for moving the target image toward the position where the processing image is displayed has been received as a touch operation through the screen, the display displays an indication image representing a position between target images that are different from the target image, and in a case where an operation for the indication image displayed on the display has been received as a touch operation through the screen, the controller performs control such that the target image for which the operation for moving the target image has been received is moved to the position between the target images and indicated by the indication image.

14. The display control apparatus according to claim 1, wherein the controller performs control such that, instead of the processing image, a list of processes determined for the processing image is moved toward the position where the target image is displayed.

15. The display control apparatus according to claim 14, wherein in a case where the operation for moving the target image toward the position where the processing image is displayed has been received as a touch operation through the screen, the display displays an indication image representing a position between target images that are different from the target image, and in a case where an operation for the indication image displayed on the display has been received as a touch operation through the screen, the controller performs control such that the target image for which the operation for moving the target image has been received is moved to the position between the target images and indicated by the indication image.

16. The display control apparatus according to claim 1, wherein in a case where the operation for moving the target image toward the position where the processing image is displayed has been received as a touch operation through the screen, the display displays an indication image representing a position between target images that are different from the target image, and in a case where an operation for the indication image displayed on the display has been received as a touch operation through the screen, the controller performs control such that the target image for which the operation for moving the target image has been received is moved to the position between the target images and indicated by the indication image.

17. An image forming apparatus comprising:

a display that displays a screen on which a target image and a processing image are arranged, the target image representing processing-target data, the processing image being an image for which a process to be performed on the processing-target data has been determined;

a controller that performs, in the case where an operation for moving the target image toward a position where the processing image is displayed has been received as a touch operation through the screen, control such that the processing image is moved toward a position where the target image is displayed and furthermore that performs, in a case where an operation for the moved processing image has been received, control such that a process determined for the processing image is applied to data represented by the target image; and an image forming unit that forms an image on a recording material in accordance with the data to which the process determined for the processing image has been applied.

18. A non-transitory computer readable medium storing a program causing a computer to execute a process, the process comprising:

displaying a screen on which a target image and a processing image are arranged, the target image representing processing-target data, the processing image being an image for which a process to be performed on the processing-target data has been determined; and performing, in a case where an operation for moving the target image toward a position where the processing image is displayed has been received as a touch operation through the screen, control such that the processing image is moved toward a position where the target image is displayed.

* * * * *